Jan. 9, 1934.　　　　S. B. ST. JOHN　　　　1,942,986
RUBBER RING CUTTING MACHINE
Filed June 27, 1932　　　　7 Sheets—Sheet 4
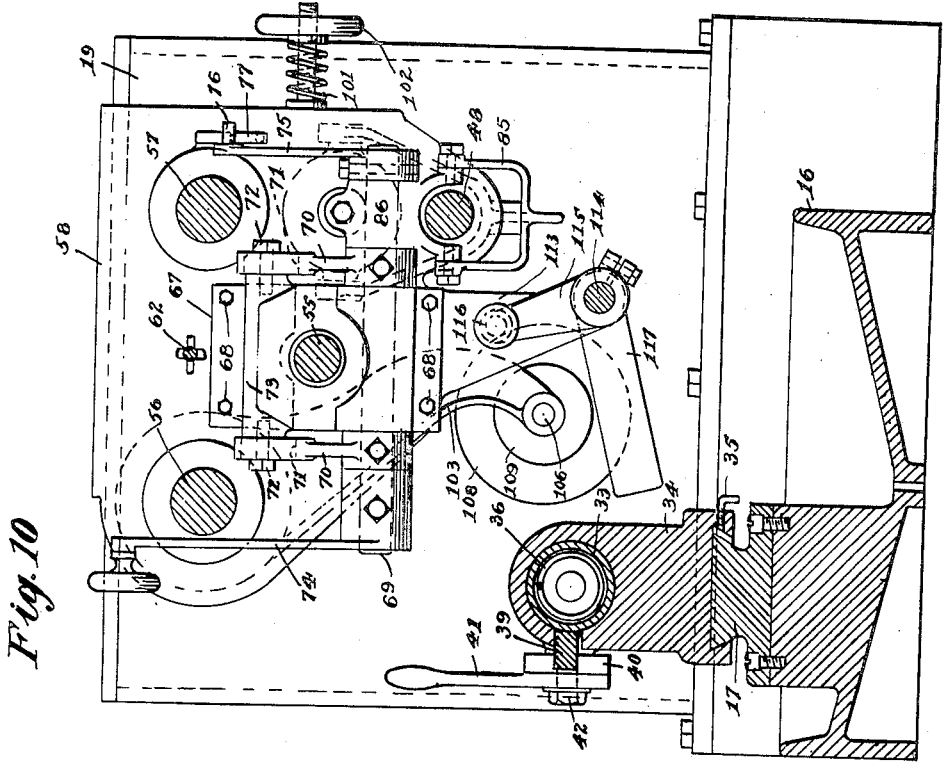
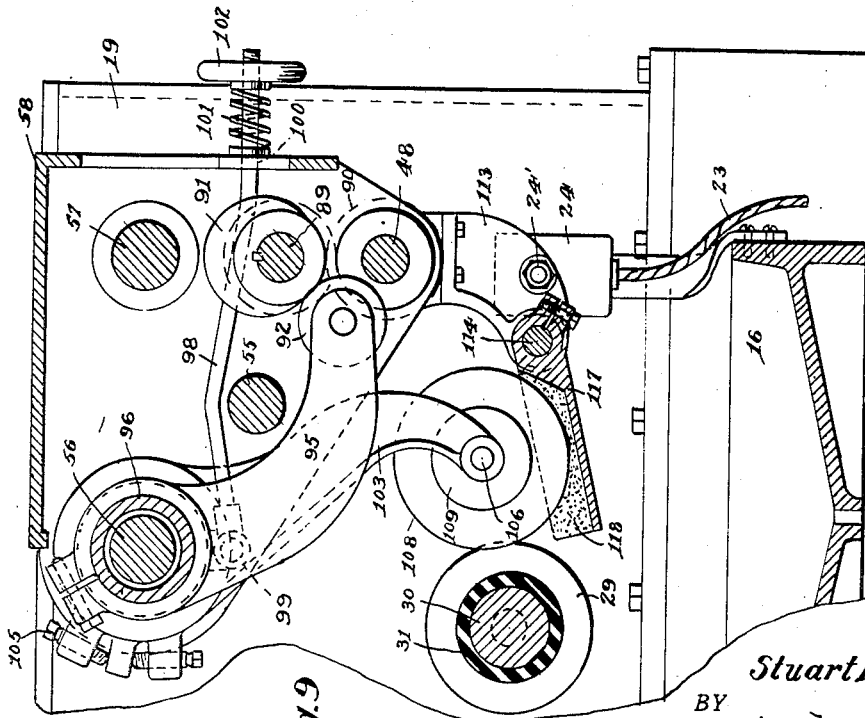
INVENTOR.
Stuart B. St. John
BY
Christian M. Newman
ATTORNEY

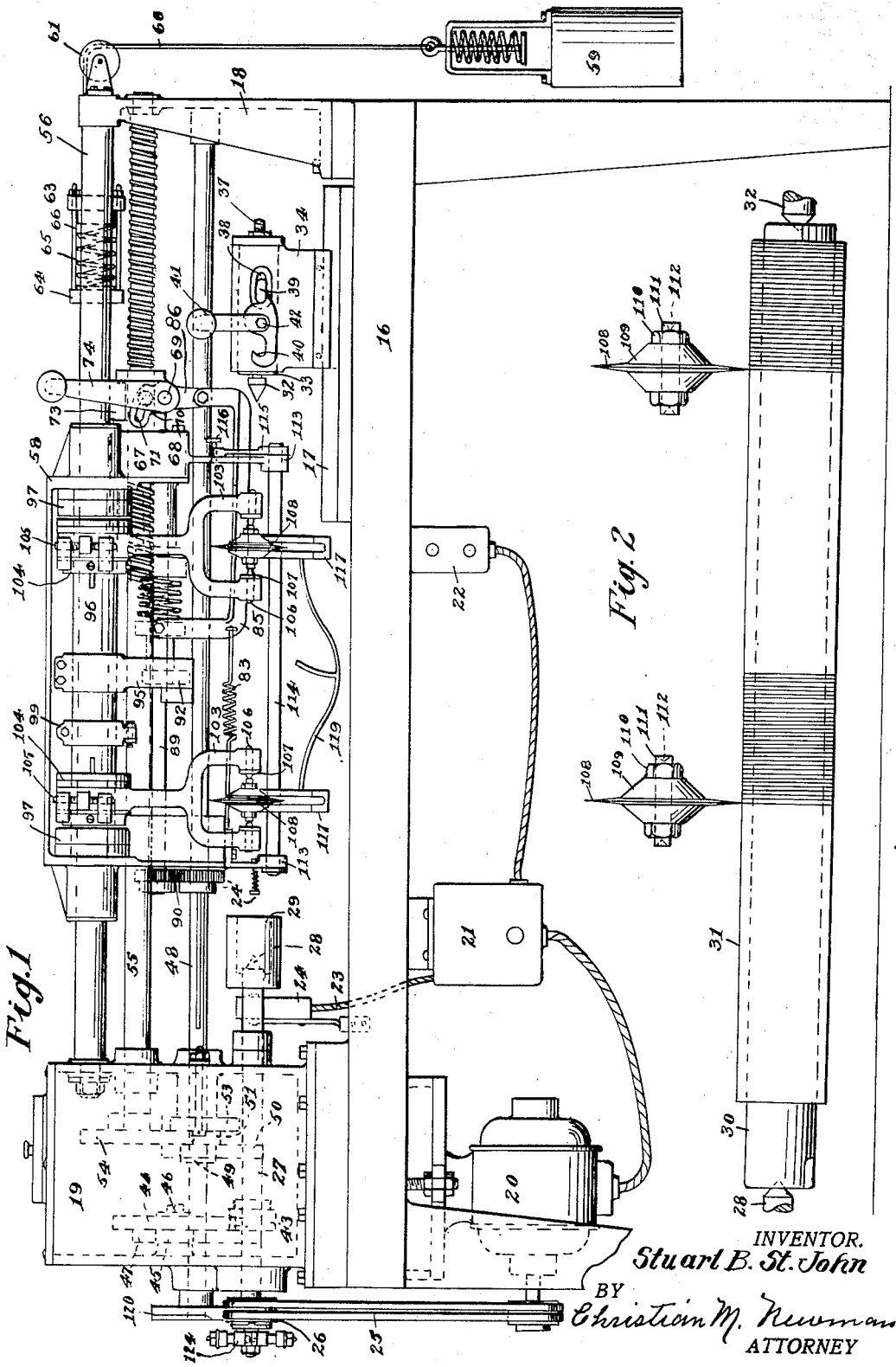

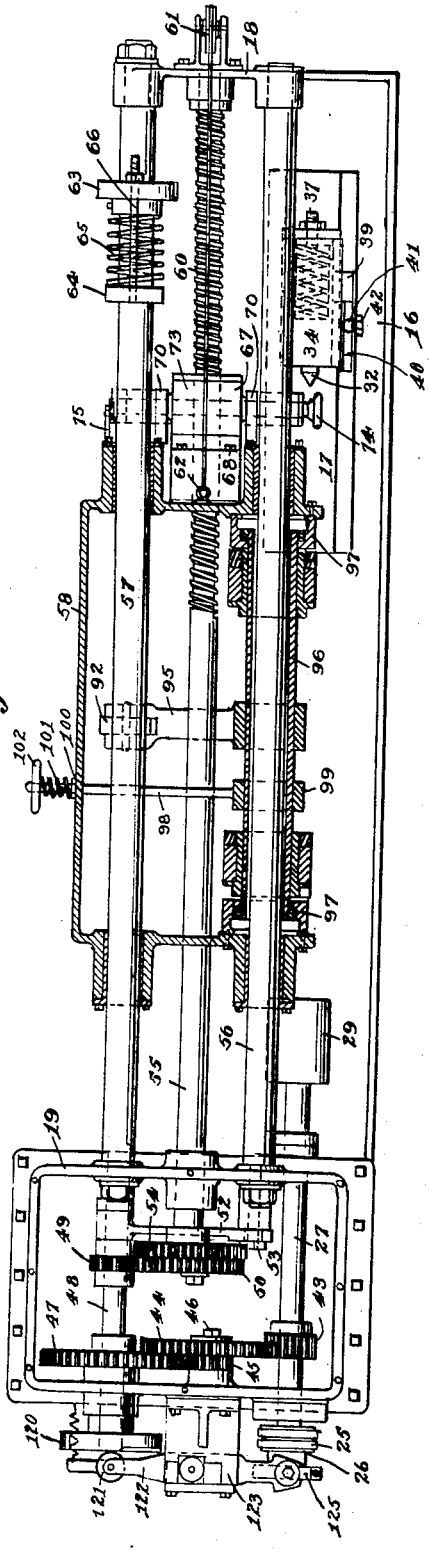

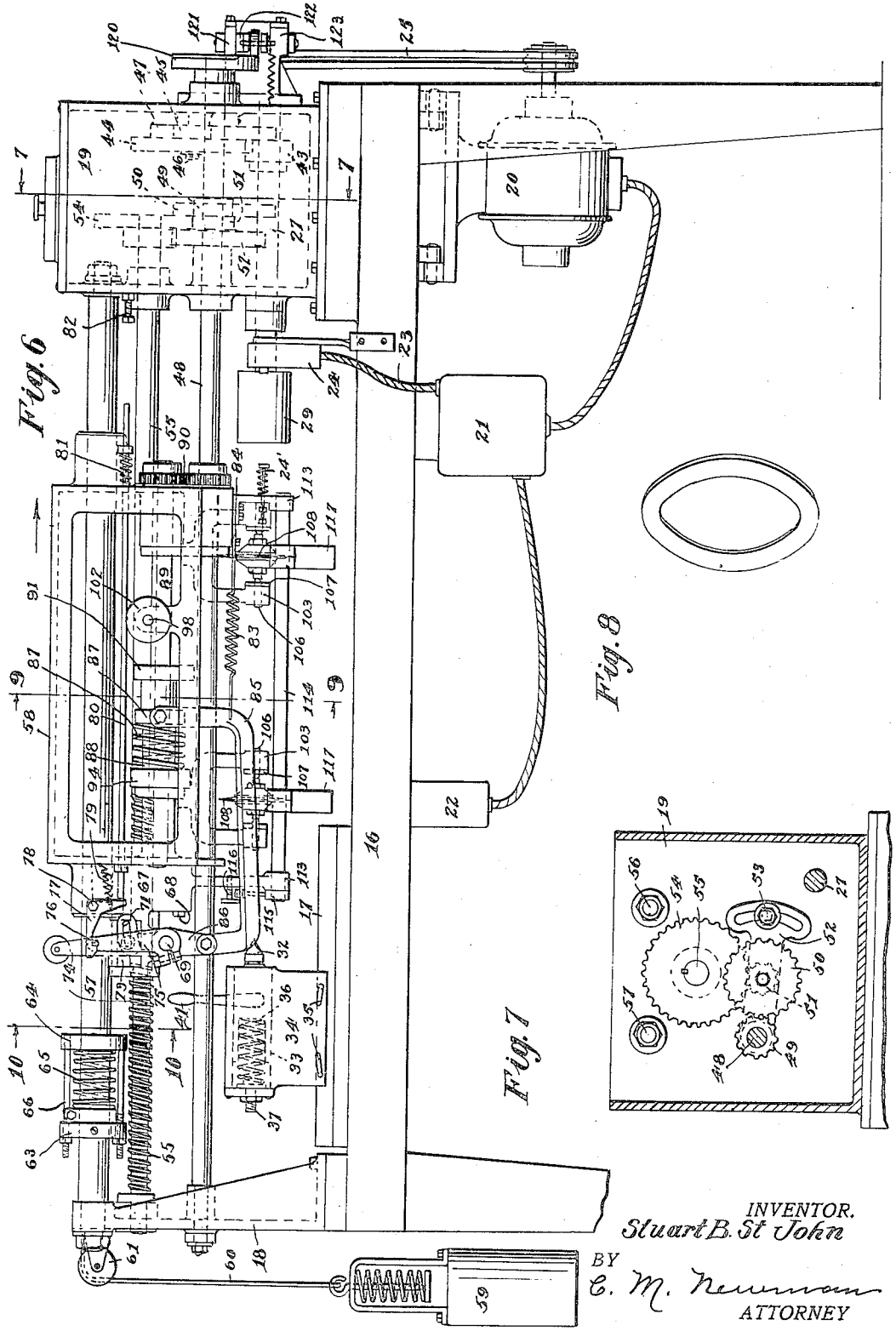

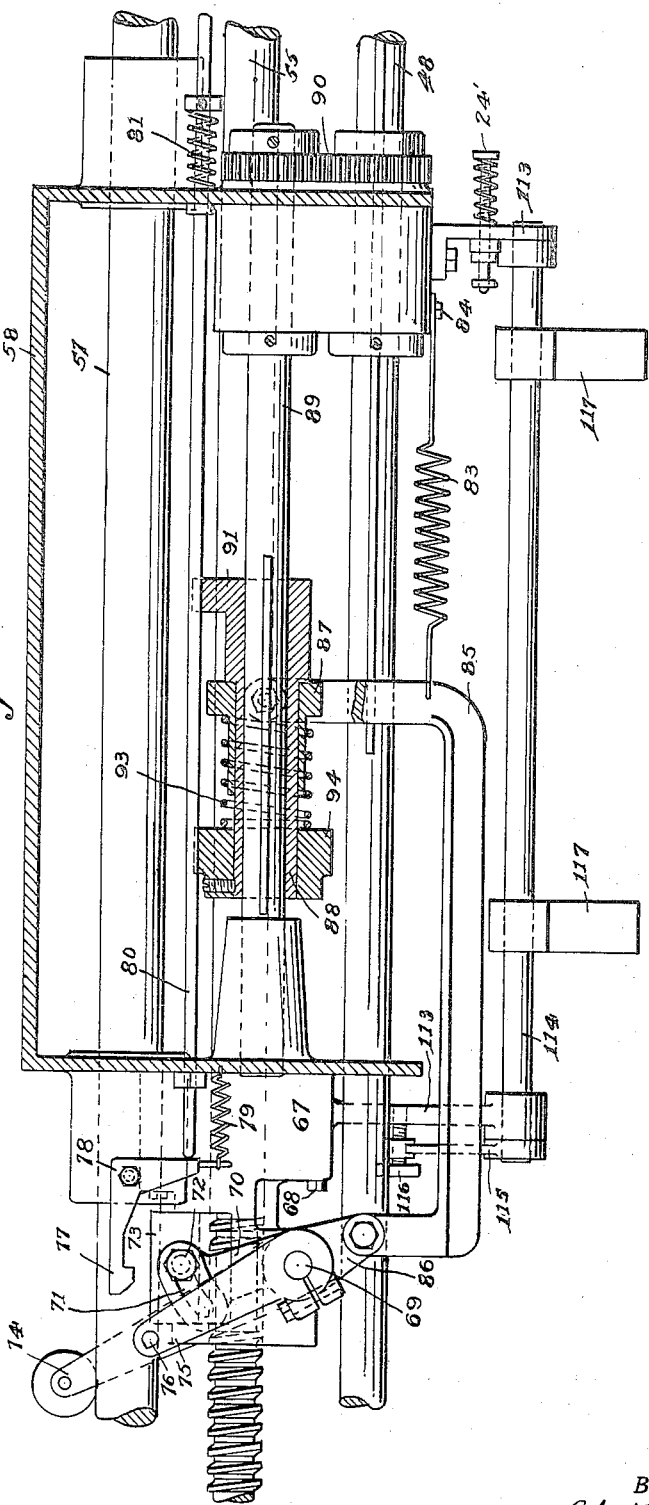
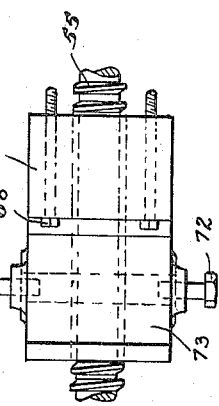

Jan. 9, 1934.                S. B. ST. JOHN                1,942,986
                      RUBBER RING CUTTING MACHINE
                       Filed June 27, 1932      7 Sheets-Sheet 6
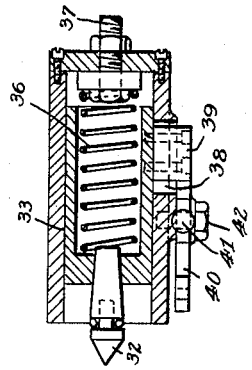
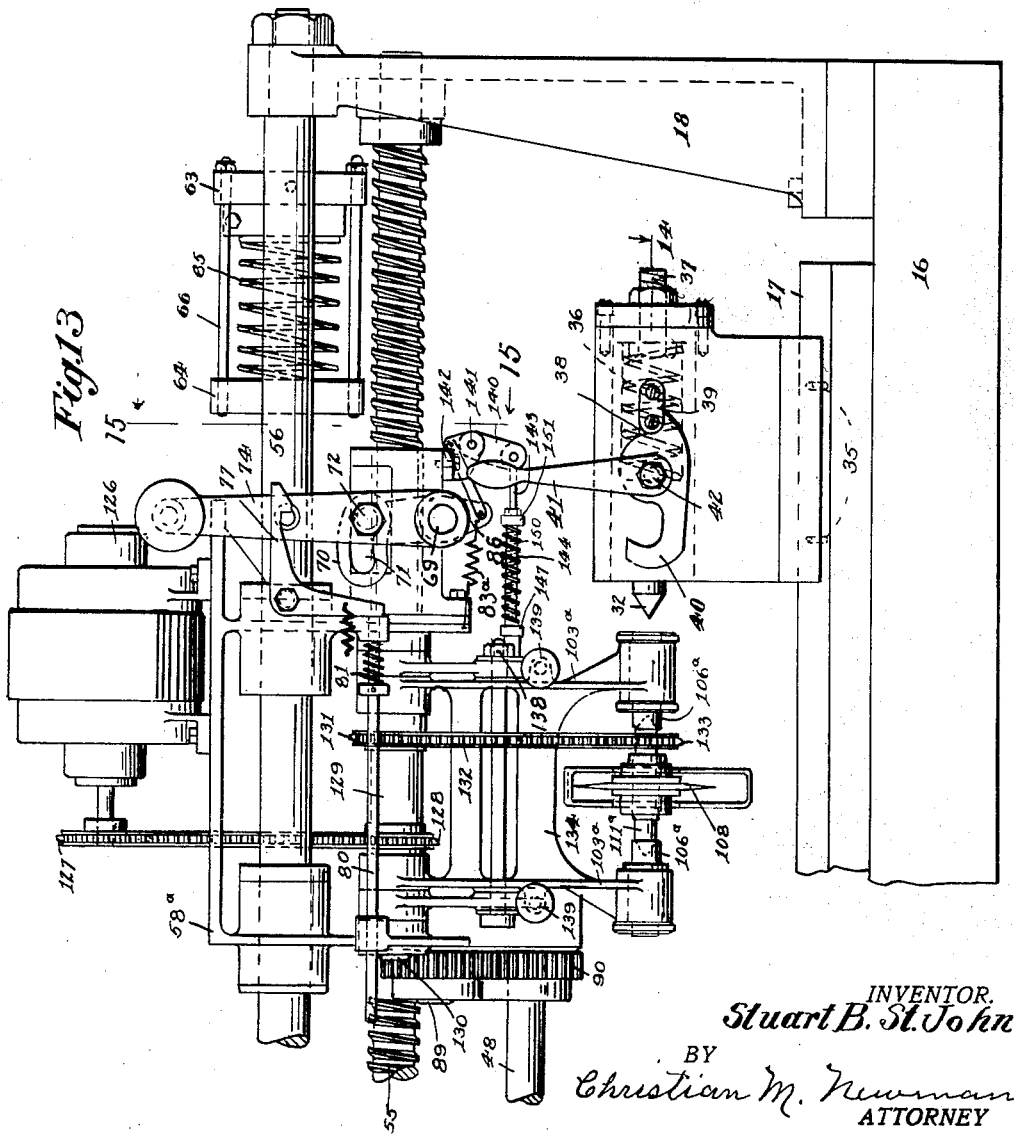
INVENTOR.
Stuart B. St. John
BY
Christian M. Newman
ATTORNEY Jan. 9, 1934.  S. B. ST. JOHN  1,942,986
RUBBER RING CUTTING MACHINE
Filed June 27, 1932   7 Sheets-Sheet 7
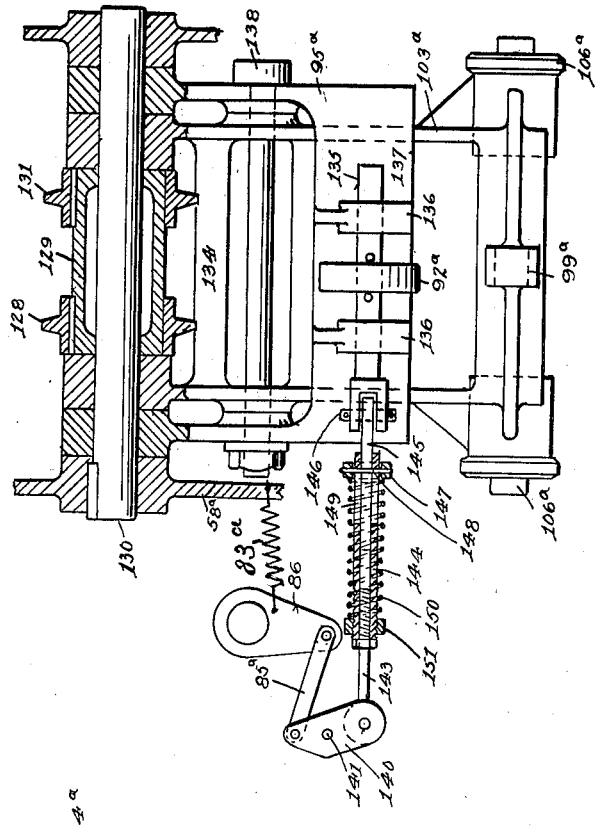
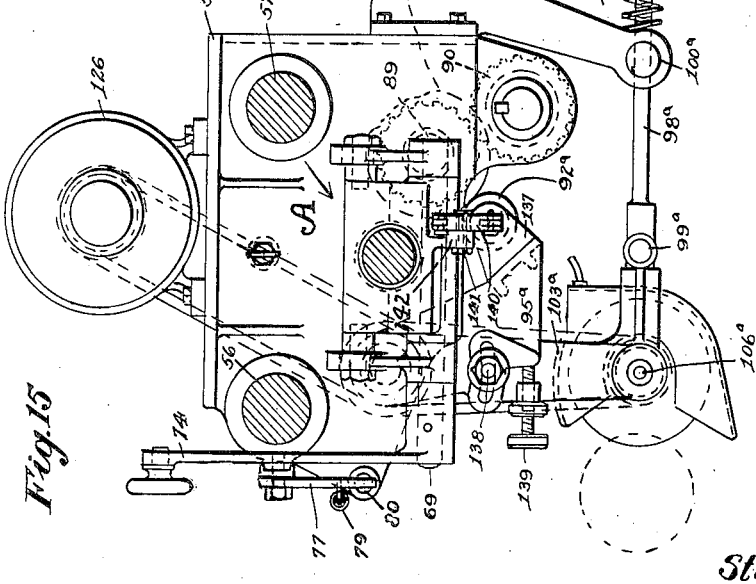
INVENTOR.
Stuart B. St. John
BY
Christian M. Newman
ATTORNEY Patented Jan. 9, 1934

1,942,986

UNITED STATES PATENT OFFICE 1,942,986

RUBBER RING CUTTING MACHINE

Stuart B. St. John, Bridgeport, Conn., assignor to The Black Rock Manufacturing Company, Bridgeport, Conn., a corporation of Connecticut Application June 27, 1932. Serial No. 619,388

23 Claims. (Cl. 164—69)

This invention relates to rubber cutting machines and more particularly to a machine for cutting rings from a tube or sleeve of rubber, or like yieldable material. The machine is adapted for cutting jar rings as well as circular packing rings or gaskets for other purposes, of various sizes.

The machine is also adapted for cutting rubber threads from thin rolled sheet rubber stock, such as are used in the manufacture of elastic webbing, and in this connection is adapted for producing rubber threads of longer lengths than can be produced by any other thread cutting process known to me.

The invention is applicable to both a single and double-blade type of machine, and its principal object is to materially increase the production of machines of the class referred to, in that I increase the relative cutting time and reduce the amount of idle or unproductive movements, by feeding the cutting knives forward continuously and by successively feeding the stock forward with the knives predetermined distances and imparting to the stock short reverse movements between each cutting operation, with the productive result that some two hundred to six hundred rubber rings may be produced per minute according to the size and quality of the stock, exclusive of the time required for the removal of the cut stock and replacement of the rubber tubes to be cut.

Heretofore the production of rubber cutting machines of this general character have been limited by the necessary mechanical movements involved, whereas in my present design of machine, it is not limited in the same way and to the same extent, and is actually performing productive cutting operations under more than eighty percent of the productive operating time of the machine. The design of the machine is also such as to permit it to be operated at a higher rate of speed, and thereby produce faster than is possible with any cutting machine now upon the market.

It is a further object of the invention to produce what may be termed a flexible type of machine; that is a machine which readily lends itself to slight modifications of construction and adjustment of parts whereby it can be adapted to produce numerous forms of rubber articles, as for instance the production of rubber threads, as before suggested, as well as rings, washers, and gaskets of various diameters and thicknesses.

The drawings illustrate a preferred form of a machine embodying the invention and designed for use in the cutting of rubber rings from a tube of rubber. The invention and its novel features as embodied in this machine will more fully appear from the accompanying description and drawings, and will be particularly pointed out in the claims.

Similar characters of reference will be used to denote like or similar parts thereto in the several figures of the accompanying drawings forming a part of this specification and in which Fig. 1 shows a front side elevation of a machine embodying my invention, and including two cutters adapted for operating upon the same rubber tube stock, not shown;

Fig. 2 shows an enlarged detached plan view of a mandrel supporting a rubber tube and a pair of rotary cutters in their relative position, as assumed when operating upon the stock, as indicated;

Fig. 3 shows a top plan view of the machine partly in section, and having the top cover to the gear housing removed;

Fig. 4 shows an enlarged top plan view of the gear housing and shafts, broken away, gears connecting the shafts, and cam operating connections intermediate the shafts, as also shown in Fig. 3;

Fig. 5 is an end view, as seen from the left of Figs. 1 and 3, better to illustrate the cam operating connections between the two said shafts;

Fig. 6 shows a rear side elevation of the machine, as seen from the opposite side of that shown in Fig. 1;

Fig. 7 shows a vertical cross section through the gear box on line 7—7 of Fig. 6;

Fig. 8 shows a perspective view of one form of jar ring such as my machine is adapted to cut;

Fig. 9 shows an enlarged vertical cross sectional view taken on line 9—9 of Fig. 6, better to illustrate the mechanism for moving the knives into and out of engagement with the tubular stock;

Fig. 10 shows a somewhat similar enlarged vertical cross sectional view taken on line 10—10 of Fig. 6, which further illustrates the cutter operating mechanism;

Fig. 11 shows an enlarged longitudinal sectional elevation of the carriage and connected trip mechanism, in a released position, different from that shown in Fig. 6;

Fig. 12 is an enlarged detached plan view of the bracket 63 shown fastened to the carriage in Fig. 11 and swung to support the engaging nut 73;

Fig. 13 is an enlarged front side view of a modified form of my invention wherein but one cutter is used, and the same driven by a separate motor mounted upon the carriage;

Fig. 14 shows a horizontal sectional view through the tail-stock taken on line 14 of Fig. 13;

Fig. 15 shows a vertical cross section taken on line 15—15 of Fig. 13; and

Fig. 16 is an enlarged detached side view, partly in section, of the cutter arm and connected roller bracket, as seen from arrow A, Fig. 15.

The preferred form of the machine herein illustrated is what might be termed a double-cutting machine as it employs two disk knives carried by a single longitudinally movable carriage, the knives being positioned in adjustable spaced relation to each other so as to adapt one to begin its cutting operation at one end of the tube and the other midway of the tube, and whereby one will traverse one end portion of the tube and the other knife the other end portion, and whereby the two will complete their cutting operations at the same time and in a manner to cut practically all the tube into rings.

These knives are automatically moved toward and from the rubber tube by a rotatable cam, which is timed with relation to the rotation of the mandrel upon which the rubber tube is mounted so that the knives will simultaneously engage the said tube and move slowly with the longitudinal movement of the mandrel and tube during the cutting operation and will simultaneously be withdrawn from the stock for an instant at the completion of each ring-cutting operation, and during which period the mandrel and stock are quickly moved backward longitudinally a fraction of the width of a ring to be cut, whereupon the cutting operation is again repeated.

Referring in detail to the characters of reference marked upon the drawings, 16 represents the machine bed which is provided with legs and a longitudinal guide-way 17. An upright 18 is secured to the top side of one end portion of the bed to form bearings for a feed screw, shafts and guide rods later to be referred to. A gear box 19 is supported on the opposite end portion of the bed and together with the upright serves to form bearings for the screw and shafts before mentioned. The particular type of machine herein illustrated is operated by a motor 20 hung to the underside of the bed, and is operated through a magnetic controller 21 from a switch button station 22. The magnetic controller is also connected by wire 23 with a stop switch 24 secured to the side of the gear housing and in the path of a yieldable contact pin 24' carried on a movable part of the machine carriage so that the machine may be automatically stopped when the cutters reach the end of the tube, with the completion of the cutting operations on the same.

25 represents belts which connect the motor with pulleys 26 secured to a driving spindle 27 journaled in the gear box 19, and which carries upon its forward end a center 28 and a chuck 29 which forms a head-stock for the rotation of the mandrel 30, see Fig. 2, upon which the rubber tube 31 is mounted, to be cut. The opposite end of the mandrel is similarly supported on a center 32 that is carried by a spring-actuated plunger 33 mounted in an adjustable tail-stock 34, see Figs. 1, 10 and 14, mounted on guide-way 17 of the bed heretofore mentioned, and is adapted to be secured in its adjusted position by means of a set screw 35. The plunger and its center are adapted to be normally held in a forwardly extended position by means of a spring 36 whose tension, against the plunger 33, may be adjusted by means of a set screw 37 mounted in the end of the tail-stock. In view of the fact that the mandrel rotates at a very high rate of speed, causing a possibility of the center 32 working back against its spring and releasing the mandrel, I have provided means for locking this center 32 in its forward position, which consists in forming a slot 38 in the side of the tail-stock to permit a lug 39 carried by the plunger 33 to project through the wall of the tail-stock for engagement by a hook 40. This hook 40 is formed integral with a handle 41 pivotally mounted upon a stud 42 secured to the side of the tail-stock, see Figs. 1, 13 and 14, as for inserting a mandrel in the machine, after which the handle is swung around to a depending position so that the hook thereof is brought into engagement with the lug in a way to confine the longitudinal movement of the center 32 and mandrel 30 within necessary limits, but will not allow the mandrel to be thrown out by accident from between the centers.

Referring to Figs. 3 and 4, it will be seen that a pinion 43 mounted on the driving spindle 27 within the gear box meshes with and drives a change gear 44 secured to a smaller gear 45, the two being mounted to rotate upon a stud 46 secured to the inside of the gear box. This smaller change gear meshes with and drives a larger gear 47 upon a cam shaft 48, one end portion of which is journaled in the gear box and the other end in the before mentioned upright 18. This cam shaft, like the driving spindle, is thus connected to be continuously driven and carries within the gear box a small change gear 49, see Fig. 3, that meshes with and drives a larger change gear 50, which together with an attached smaller gear 51 are mounted upon a stud carried by an adjustable bracket 52 mounted to swing on the cam shaft 48 and secured in an adjusted position by a screw 53. The smaller driven gear 51 meshes with and drives a larger gear 54, see Fig. 1, mounted upon one end of a feed screw 55, one end of which is journaled in the gear box and the other end in the upright 18 secured to the opposite end of the machine. In addition to the cam shaft 48 and lead screw 55 there is also provided two non-rotatable guide rods 56 and 57, one end of each of which are secured in the upper portion of the gear box and the other ends in the upright 18. These guide rods serve to support a carriage 58 that is mounted for longitudinal movement thereon, being fed in one direction by the feed screw 55 against the action of a weight 59 hung from a cable 60 which passes over a pulley 61 and has its upper end portion secured to the carriage as at 62, see Fig. 3.

In this connection I have provided a bumper, see Figs. 3 and 6, on the guide rod 57, which comprises a collar 63 that is secured to the guide rod, and a collar 64 that is slidably mounted on the guide rod and a spring 65 on the rod, as between the two collars to normally hold them yieldably extended one from the other, said extended movement being limited by rods 66 carried by the movable collar 64 and having threaded ends that are slidably mounted in the fixed collar 63, there being nuts positioned on said threaded ends to adjust the position of the movable collar and the tension of the spring bearing thereagainst. From this construction, it will be seen that when the carriage is released by the tripping device, the weight will promptly draw the carriage back until it becomes engaged and rests against the bumper preparatory to the beginning of a further operation.

I provide a detachable connection of the carriage with the feed screw, that is adapted to be automatically operated to permit a quick but short backward movement of the carriage to starting position. In this respect, attention is called to Figs. 10, 11 and 12 wherein it will be seen that a bracket 67 is secured to the rear end of the carriage by means of screws 68, that serve to support a cross rocker shaft 69, the two ends of which extend from both the front and rear sides of the bracket and carry a vertically disposed arm 70 upon each side of the bracket. The upper ends of these arms are provided with a cam slot 71 that engages aligned pins 72 which are fixed in opposite sides of a half-nut 73 guided for vertical movement between the two side walls of the before mentioned bracket and whereby the nut can be raised and lowered by the swinging of the arms for the engagement and disengagement of the nut with the feed screw that passes freely through the bracket. This nut, its cam slotted operating arms, and operating shaft are manually manipulated by an operating handle 74 secured to one end portion of the shaft as for connecting the carriage to the feed screw for feeding operations. The automatic releasing of this nut 73 engagement with the feed screw is brought about with the completion of the cutting operation when the carriage reaches the end of its movement, as will be later described.

I provide means for automatically locking the nut in engagement with the feed screw as the handle is brought to a vertical position, which consists in mounting an arm 75 on the rear end of the rocker shaft 69 and securing a pin 76 in its upper end for engagement by a spring-actuated latch 77 formed in one arm of a bell crank lever, that is mounted to swing on a screw 78 secured to the carriage, one end of the spring 79 being connected to the carriage and the other to the depending end of the bell crank lever. This depending end of the bell crank engages the end of a slide rod 80 mounted in the carriage and provided with a spring 81 upon its forward end to normally hold it in engagement with the depending end of the bell crank. The forward end of the rod is in alignment with an adjustable stop screw 82 secured to the side of the gear box so that as the carriage reaches its extreme forward position, with the completion of its cutting operations, the rod will engage the screw in a way to move longitudinally and disengage the latch, leaving the arm, handle, and shaft free to disengage the nut from the feed screw. This quick disengagement of the nut is brought about by a spring 83, one end of which is secured to the carriage at 84 and the other end to a U-shaped link 85. The rear end of this link is hingedly connected to a depending arm 86 secured to the rocker shaft 69, between the arms 70 and 75, so that movement of the shaft and its connected parts are insured by movement of the link.

The forward end of this U-shaped link is hingedly connected to a sleeve 87 that is slidably mounted on a relatively longer cam sleeve 88 which in turn is keyed to slide on a short shaft 89 whose ends are journaled in opposite end portions of the carriage and driven through gears 90 from the before mentioned cam shaft 48.

In order that an attendant may operate the hand lever 74 and its connected arms 70 and 75 to engage the latch 77, to start the machine without waiting for the lower surface of the cam 91 to come into registration with the roller 92, I provide automatic means for shifting said cam which comprises a spring 93 positioned on cam sleeve 88 between the slidable sleeve 87 and a thrust collar 94 secured to the cam sleeve 88, see Fig. 11. The cam sleeve is provided with a cam 91 upon its forward end to operate the roller 92, see Fig. 9, carried by an arm 95 secured to the hollow rocker shaft 96 whose opposite end portions are provided with ball bearings 97 for mounting in the carriage.

The cam roller 92 is adapted to normally ride on the cam 91 and is provided, see Fig. 9, with adjustable spring means for holding the cam roller 92 in engagement with the cam 91, which includes a rod 98, one end of which is connected to an arm 99 carried by the hollow rocker shaft 96, the other end extending through a hole 100 in the back face of the carriage and provided with a tension spring 101 and a nut 102 that is adjustably mounted upon the threaded end of the rod 98. By this means more or less tension of the roller 92 against the cam may be provided, and the knives normally held out of cutting engagement with the rubber tube.

The cam 91 is adapted to slide on the shaft 89 through the movement of the before mentioned link 85 for the purpose of bringing the cam into and out of registration with the roller carried by arm 95, it being understood that this movement of the cam with respect to the roller is accomplished automatically with the tripping of the machine and disengagement of the nut 73 at a time when the roller is in alignment with the lower face of the cam. This movement of the cam, off of the roller, is accomplished by the movement of the link 85 to the right as shown in Fig. 11, the same being moved at a time when the cutting operations upon the rubber tube have been completed and the knives withdrawn from the stock.

As shown in Figs. 1, 6 and 9, a pair of forked cutter arms 103—103, of like construction, are mounted upon the hollow rocker shaft 96, which in turn is slidably mounted on the fixed guide rod 56 whose ends are secured in the upright 18 and gear box. These arms are mounted on short sleeves 104 that are adjustably mounted, keyed and secured to the hollow rocker shaft 96, see Fig. 1. These cutter arms 103 are adapted to be adjusted and secured in positions upon the sleeves 104 by screws 105 threaded into lugs on 103 and that engage opposite sides of lugs of said sleeves, so as to set the cutting edges of the knives in proper relation to the mandrel. The lower end of these arms are forked, each fork being provided with a bearing-pin 106 that is threadably mounted in the forks and secured in adjusted positions by nuts 107 on their end portions.

The rotatable knives 108 are secured between two plates 109 that are clamped by nuts 110 mounted upon a threaded arbor 111 and provided with a central tapered socket 112 in each end to receive the tapered end of the bearing pins 106 in the forks of the arms 103. These arms and their cutters are thus adapted to be simultaneously moved into and out of cutting relation with the rubber tube 31 by the rotation of the cam 91 with the cam shaft 89. The knives, see Fig. 9, are positioned to the rear of the tubular stock and are consequently moved forward and backward by the action of the cam, as just referred to, and are free to rotate in their cutting operation by their engagement with the rotating rubber tube.

In connection with the cutting operations of the knives, as above described, I provide means for supplying a cutting lubricant to the knives as will next be described, and which consists in providing a bracket 113 on the inside of each end portion of the carriage, that form bearings for a rocker shaft 114, that is provided with an arm 115 upon one end for the rotatable adjustment of the shaft and which is secured in a normal operative position by means of a screw 116, see Fig. 1, that engages and holds the free end of the arm with respect to the bracket.

Two suitable lubricant containers 117, one for each knife, are secured to the rocker shaft 114 and are adapted to be raised and lowered by the adjustment of the shaft through its arm 115. These containers, see Fig. 9, are of like construction and designed to carry a sponge for holding cutting lubricant which may be supplied thereto in any suitable manner, as by flexible piping 119, shown broken away. These containers are enclosed, except for a slot in their top and forward end that aligns with the knives and is of sufficient size and dimension to receive the knives so the same are free to run in the lubricant soaked sponge during the cutting operations.

As has already been explained, the mandrel and rubber stock carried thereby are given successive slow forward movements during the cutting operations of the knives, which movements are timed in unison with the sidewise movements of the knives so as to allow the knives to perform their cutting operations while being moved forward. These movements of the mandrel are alternately interrupted and the mandrel dropped back a distance equal to that which it has just travelled forward, represented by a fraction of the thickness of the ring to be cut. I will now proceed to describe the mechanism for the synchronous operation of this mandrel which is an important feature of the machine since it allows for the continuous forward movement of the cutters and consequently an increased production of rings.

Referring to Figs. 4, 5 and 6, it will be seen that I provide a face cam 120 on the outer end of the shaft 48, which is engaged by a roller 121 carried on one end of a spring-actuated lever 122, that is adjustably mounted in a bracket 123 secured to the outer side of the gear box, the other end of said lever being provided with a fork that is pivotally connected to a yoke 124 which in turn encircles a ball bearing 125 mounted on the driving spindle so as to provide an operative engagement for both rotary and longitudinal movements of the driving spindle, for the longitudinal operation of the mandrel and its rubber tube. The pitch of this cam is such as to provide, with each rotation of the cam, a slow forward movement of the driving spindle and its mandrel in unison with the movement of the knives during the cutting operations and to allow the spindle and its mandrel to be quickly shoved back by the spring 36 in the tail-stock.

The description thus far written applies more especially to the two-knife type of machine shown in Figs. 1 to 12 inclusive, though it applies equally well in most respects to the modified form of machine shown in Figs. 13, 15 and 16, as for instance the bed, the gear box, shafts, guide rods, head-stock and tail-stock are like that shown in the preferred form of the machine, and the carriage is very similar. This machine is adapted to perform the same class of operations as the other form of machine in unison with the rotations and movements of the mandrel, but in this instance they are performed with a single knife instead of two knives. While this modified form of the invention is adapted to perform much the same class of operations as the other, in unison with the rotation and movements of the mandrel, yet in this instance, due to the fact that a single knife is employed instead of two knives, it is perhaps better adapted for cutting rubber threads from thin rolled sheet rubber stock than would be the case with the double knife machine. The single knife would obviously start its operations on one end of the mandrel and gradually feed through it until the entire tube would be cut.

While this single-knife type of machine is not so rapid, from a production standpoint, yet it is very desirable, especially on high priced material, since there is less waste of stock than what is produced with my double-knife machine. The disk knives shown in the double type of machine are not directly driven, being caused to rotate in their cutting operations, by their frictional engagement with the rotating stock and mandrel, but it will be understood that power may be applied to these knives, if desired, as is shown in Fig. 13, which illustrates a modified form of the invention. In this showing, a motor 126 is mounted upon the carriage 58ᵃ and connected by a sprocket 127 with a sprocket 128 secured to a hollow shaft 129 mounted on a shaft 130 secured in opposite end portions of the carriage 58ᵃ. Upon this hollow shaft 129 is also mounted a sprocket 131 that is connected by a sprocket chain 132 with a sprocket 133 on the knife arbor.

In this connection it will be observed that the knife arms 103ᵃ are connected as by means of a web 134 and are mounted to swing on the shaft 130. The lower end portions of these arms, as in the preferred form, carry bearing pins 106ᵃ for the support of the arbor 111 upon which the disk knife and the before mentioned sprocket 133 are mounted.

In the modified form I also provide spring means for holding the roller 92ᵃ against the cam 91ᵃ and the knife out of engagement with the tubular stock 31, which consists, see Fig. 15, in providing a lug 99ᵃ on the knife arm 103ᵃ and connecting it to a rod 98ᵃ that extends through a swivel pin 100ᵃ carried by a bracket 134ᵃ, there being a spring 101ᵃ adjusted by means of a nut 102 mounted on the threaded end of the rod and whereby the tension of the spring may be varied to better regulate the pressure of the roller 92ᵃ against the face of the cam 91ᵃ.

In this single-knife, modified form of machine shown in Figs. 13, 15 and 16, I provide means for shifting the roller 92ᵃ on the arm that supports the knife instead of shifting the cam as in the other form of machine, the one obviously being the equivalent of the other. This modified means consists in mounting the roller 92ᵃ on a shaft 135 that is slidably mounted in bearings 136 of the roller bracket 95ᵃ hung on a short shaft 130 and which shaft also carries the cutter arms 103ᵃ and the roller bracket 95ᵃ. The roller bracket, in this form, includes a web 137 which insures rigidity, and has its upper ends pivotally hung on the shaft 130, the said bracket being adjustably connected to the knife arms 103ᵃ by means of a bolt 138 carried by the knife arms 103ᵃ and passing through slots in the roller bracket, and provided with nuts for securing the parts together so that they swing backward and forward together. The adjustment of these two members with respect to each other is facilitated by adjusting screws 139 carried by the knife arms 103ᵃ and positioned for engagement with shouldered portions of the roller bracket 95ᵃ.

The slidable roller shaft 135 is mounted in bearings 136 formed on the roller bracket and in its normal position, as shown in Fig. 16, is adapted to ride on the cam 91ᵃ mounted on the shaft 89 which, as shown, is geared to be driven from the adjacent shaft 48 through gears 90. In referring to the normal position of these parts, I refer to the operating position of the machine and wherein the handle 74 is positioned and held by the latch 77 for the engagement of the nut with the feed screw. When the machine is tripped, however, and the latch disengaged for the release of the arms 70, shaft 69 and the nut, the spring 83ᵃ serves to pull the roller and its shaft to the left through the mechanism shown in Figs. 13 and 16, which comprises a link 85ᵃ, one end of which is connected to the arm 86 carried on the shaft 69, whereas the other end is hingedly connected to a lever 140 pivotally mounted at 141 in a bracket 142, the other end of said arm being pivotally connected to the end of a rod 143 adjustably mounted in one end of a tube 144. A second rod 145 is slidably mounted in the opposite end of this tube and has its outer end portion extended and connected as at 146 to the end of the before mentioned slidable shaft. A collar 147 is slidably mounted on one end portion of the tube and is provided with a pin 148 that extends through a slot 149 of the tube and engages the slidable rod 145 so that the rod, pin and collar are slidable with relation to the tube and against the action of a spring 150 mounted on the outer surface of the tube between the before mentioned collar 147 and a fixed collar 151 on the threaded end of the tube.

This arrangement obviously insures a positive outward pulling movement on the roller shaft 135 when the lever has been released, for the purpose of moving the roller out of engagement with the cam, which obviously is timed to be moved when the roller is riding on the lower surface of the cam. This link connection, through its yieldable spring means, provides for a limited movement of the roller with respect to the cam; that is a movement of the roller up against the side of the cam, in case the lower surface of the latter happens not to be in registration with the roller, whereupon the roll merely rides against the side of the cam until its lower face comes into registration with the roller, whereupon it promptly snaps in upon the face of the cam. This obviously permits the operating lever 74 of the machine to be manually positioned to engage the nut with the feed screw and in a way to permit the latch to be engaged and retain the nut in position, thus leaving the machine free to be started, irrespective of the relative position of the roller and cam. The knife, however, is not swung into operative engagement with the stock until the roller has become properly positioned on the face of the cam.

Having thus described the construction of the machine, I will briefly review its operation, see Figs. 1 and 6, assuming the carriage to be in a starting position at one end of the machine, against the bumper, the operator would first place one end of a mandrel supporting a rubber tube in the chuck 29 and the other end in alignment with the center 32, whereupon the handle 41 would be dropped, allowing the center to move forward in a way to support and hold the mandrel in rotatable engagement. Thereafter the operator would operate switch 22 to start the motor and drive the chuck, mandrel, feed screw and cam shaft.

The hand lever 74 would be raised, as from the position shown in Fig. 11 to that shown in Figs. 1 and 6, for the purpose of engaging the nut 102 with the feed screw, and the cam with the cam roller. With the parts in this position, the carriage obviously moves forward continuously, the knife arms oscillate, moving the knives into and out of engagement with the rubber stock in a way to cut a ring with each forward movement, the mandrel, as before explained, moving forward slowly with the knives during the cutting operations and moving back quickly while the knives are being withdrawn from and returned to the stock.

In the two-knife machine, one knife starts to work at one end of the mandrel and the other at the center, so that the two knives, finishing at the same time, will cut the entire tube into rings, whereas with the single knife machine, the knife starts at one end of the tube and is fed along the entire length of the tube in a way to cut it all.

With the completion of the cutting operations, the rod 80 engages the stop 82 in a manner to disengage the latch and release the arm 77 and the nut 102 from the feed screw, leaving the carriage free to be returned by the weight 59 to its normal or starting position. The yieldable contactor 24' mounted in the forward end of the carriage engages the switch 24 substantially simultaneous with the releasement of the latch above mentioned, so that the motor is stopped at the completion of the cutting of each tube, better to permit the same to be removed and a new one replaced in the machine preparatory to further cutting operations.

In practice, when operating on rubber stock with a two-knife machine, such as is used for jar ring purposes, it is possible to cut a rubber tube 40 inches in length, in a little less than a minute and a half, and in a way to produce four hundred and eighty jar rings.

Having thus described my invention, what I claim and desire to secure by Letters Patent is:

1. A jar ring cutting machine comprising a mandrel for supporting a rubber tube to be cut, a rotatable cutter, an arm for mounting the cutter, a carriage in which the arm is mounted, means for feeding the carriage longitudinally with respect to the mandrel, means for moving the cutter into and out of cutting relation with the mandrel, and means for intermittently moving the mandrel forward longitudinally a limited distance during each cutting operation.

2. A jar ring cutting machine comprising a mandrel for supporting a rubber tube to be cut, a rotatable cutter, an arm for mounting the cutter, a carriage in which the arm is mounted, means for feeding the carriage longitudinally with respect to the mandrel, means for moving the cutter into and out of cutting relation with the mandrel, and means for rotating the mandrel and moving it forward during the cutting operations.

3. A jar ring cutting machine comprising a mandrel for supporting a rubber tube to be cut, a rotatable cutter, an arm for mounting the cutter, a carriage in which the arm is mounted, means for feeding the carriage longitudinally with respect to the mandrel, means for moving the cutter into and out of cutting relation with the mandrel, means for rotating the mandrel and moving it forward during the cutting operations, and means for moving the mandrel backward longitudinally between each cutting operation.

4. A jar ring cutting machine comprising a mandrel for supporting a rubber tube to be cut, means for mounting the mandrel to permit longitudinal movements of the same, a rotatable cutter, an arm for mounting the cutter, a carriage in which the arm is mounted, means for feeding the carriage longitudinally with respect to the mandrel, means for moving the cutter into and out of cutting relation with the mandrel, means for rotating the mandrel and moving it forward during cutting operations, and means for moving the mandrel backward longitudinally between each cutting operation.

5. A jar ring cutting machine comprising a mandrel for supporting a rubber tube to be cut, a rotatable cutter, an arm for mounting the cutter, a carriage in which the arm is mounted, means for feeding the carriage longitudinally with respect to the mandrel, means for moving the cutter into and out of cutting relation with the mandrel, means for rotating the mandrel, and means for intermittently moving the mandrel forward and backward with each cutting operation.

6. A jar ring cutting machine comprising a mandrel for supporting a rubber tube to be cut, a rotatable cutter, an arm for mounting the cutter, a carriage in which the arm is mounted, means for feeding the carriage longitudinally with respect to the mandrel, means for moving the cutter into and out of cutting relation with the mandrel, means for moving the mandrel forward longitudinally during cutting operations, means for rotating the mandrel during cutting operations, and means for moving the mandrel backward longitudinally between each cutting operation.

7. A jar ring cutting machine comprising a mandrel for supporting a rubber tube to be cut, a rotatable cutter, an arm for mounting the cutter, a carriage in which the arm is mounted, means for feeding the carriage longitudinally with respect to the mandrel, means for moving the cutter into and out of cutting relation with the mandrel, means for rotating the mandrel, means for moving the mandrel longitudinally with movement of the cutters, means for interrupting said movement of the mandrel with the completion of each cutting operation, and means for moving the mandrel backward limited distances with each interruption.

8. A jar ring cutting machine comprising a frame including guide rods, a feed screw, a carriage mounted on the rods, means to engage the carriage with the feed screw, automatic means to disengage the carriage, means to return the carriage to normal position, a mandrel for supporting a rubber tube to be cut, a rotatable cutter, an arm for mounting the cutter, cam means for moving the cutter arm into and out of engagement with the rubber stock, and means for moving the mandrel forward longitudinally during the cutting operations.

9. A jar ring cutting machine comprising a frame including guide rods, a feed screw, a carriage mounted on the rods, means to engage the carriage with the feed screw, automatic means to disengage the carriage, means to return the carriage to normal position, a mandrel for supporting a rubber tube to be cut, a rotatable cutter, an arm for mounting the cutter, cam means for moving the cutter arm to engage the cutter with the tubular stock to be cut, means for connecting the automatic disengaging means for the carriage with the cam means whereby the latter is operated simultaneously with said automatic means to release the cutter arm and disengage the cutter, and means for moving the mandrel forward longitudinally in synchronism with the carriage during the cutting operation.

10. A jar ring cutting machine comprising a frame including guide rods, a feed screw, a carriage mounted on the rods, means to engage the carriage with the feed screw, automatic means to disengage the carriage at the end of its travel, a yieldable bumper against which the carriage strikes when released, means to return the carriage to normal position, a mandrel for supporting a rubber tube to be cut, a rotatable cutter, an arm on the carriage for mounting the cutter, means for moving the cutter arm into engagement with the tubular stock to be cut, means for operatively connecting the automatic disengaging means for the carriage with the cutter arm operating means to release the cutter arm for the disengagement of the cutter, and means for moving the mandrel forward longitudinally in synchronism with the carriage during the cutting operation.

11. A jar ring cutting machine comprising a frame including guide rods, a feed screw, a carriage mounted on the rods, means to engage the carriage with the feed screw, automatic means to disengage the carriage, means to return the carriage to normal position, a mandrel for supporting a rubber tube to be cut, a rotatable cutter, an arm for mounting the cutter, cam means for moving the cutter arm to engage the cutter with the tubular stock to be cut, means for connecting the automatic disengaging means for the carriage with the cam means whereby the latter is operated simultaneously with said automatic means to release the cutter arm for the disengagement of the cutter, means for moving the mandrel forward longitudinally in synchronism with the carriage during cutting operations, and means for moving the mandrel backward limited distances with the completion of each cutting operation.

12. A jar ring cutting machine comprising a frame including guide rods, a feed screw, a carriage mounted on the rods, means to engage the carriage with the feed screw, automatic means to disengage the carriage, means to return the carriage to normal position, a mandrel for supporting a rubber tube to be cut, a cutter arm, a rotatable cutter carried thereby and adapted to be moved into and out of engagement with the rubber tube to be cut, a rotatable shaft journaled in the carriage, a cam slidably mounted on said shaft adapted to engage and disengage the arm to impart a swinging movement thereto, yieldable means for moving the cam into engagement with said arm, and automatic means for disengaging the cam from the arm.

13. A jar ring cutting machine comprising a frame including guide rods, a feed screw, a carriage mounted on the rods, a nut carried by the carriage to engage the feed screw, a rocker shaft mounted in the carriage, arms carried on said shaft to engage and disengage the nut and feed screw, a handle on said shaft for operating the same and nut, a spring for normally holding the nut out of engagement from the feed screw, a spring-actuated latch for engaging the handle to hold the nut in engagement with the feed screw, and means for automatically releasing the latch and nut at a predetermined time to disengage the carriage.

14. A jar ring cutting machine comprising a frame including guide rods, a mandrel for supporting a rubber tube to be cut, a cutter arm, a cutter carried thereby, cam means for moving the arm and cutter into engagement with the rubber tube to be cut, a feed screw, a carriage mounted on the guide rods, a nut carried by the carriage to engage the feed screw, a rocker shaft mounted in the carriage, arms carried on said shaft to engage and disengage the nut and feed screw, a handle on said shaft for operating the shaft and nut, a spring for normally holding the nut out of engagement from the feed screw, a spring-actuated latch for engaging the handle to hold the nut in engagement with the feed screw, and means for automatically releasing the latch and nut at a predetermined time to disengage the carriage.

15. A jar ring cutting machine comprising a frame including guide rods, a mandrel for supporting a rubber tube to be cut, a cutter arm, a cutter carried thereby, cam means for moving the arm and cutter into engagement with the rubber tube to be cut, a feed screw, a carriage mounted on the guide rods, a nut carried by the carriage to engage the feed screw, a rocker shaft mounted in the carriage, arms carried on said shaft to engage and disengage the nut and feed screw, a handle on said shaft for operating the shaft and nut, a spring for normally holding the nut out of engagement from the feed screw, a spring-actuated latch for engaging the handle to hold the nut in engagement with the feed screw, means for automatically releasing the latch and nut at a predetermined time to disengage the carriage, and operative connections between the rocker shaft and cam for engaging and disengaging the cam means and cutter arm.

16. A jar ring cutting machine comprising a frame, a carriage and means for feeding the same longitudinally, a mandrel for supporting rubber stock to be cut, means for rotating the same, means for alternately moving the mandrel longitudinally with the movement of the carriage, a rocker shaft mounted in the carriage, spaced-apart cutter arms mounted on the rocker shaft, a cutter carried by each arm, an operating arm also mounted on the rocker shaft, a cam for engagement with the rocker arm to operate the same, the shaft and cutter arms, and a spring to hold the cutter arm in engagement with the cam.

17. A jar ring cutting machine comprising a frame, a carriage and means for feeding the same longitudinally, a mandrel for supporting rubber stock to be cut, means for rotating the same, means for alternately moving the mandrel longitudinally with the movement of the carriage, a rocker shaft mounted in the carriage, spaced-apart cutter arms mounted on the rocker shaft, a cutter carried by each arm, an operating arm also mounted on the rocker shaft, a cam for engagement with the rocker arm to operate the same, the shaft and cutter arms, and means to engage and disengage the cam and operating arm to effect alternate cutting operations upon stock carried on the mandrel.

18. A jar ring cutting machine comprising a frame, a carriage and means for feeding the same longitudinally, a mandrel for supporting rubber stock to be cut, means for rotating the same, means for alternately moving the mandrel longitudinally with the movement of the carriage, a rocker shaft mounted in the carriage, spaced-apart cutter arms mounted on the rocker shaft, a cutter carried by each arm, an operating arm also mounted on the rocker shaft, a rotatable cam shaft journaled in the carriage, a cam mounted on said shaft for engagement with the rocker arm to impart swinging movement thereto, a spring to hold the operating arm in engagement with the cam, yieldable means for moving the cam into engagement with said arm, and automatic means for disengaging the cam and arm.

19. A jar ring cutting machine comprising a frame, a carriage and means for feeding the same longitudinally, a mandrel for supporting rubber stock to be cut, means for rotating the same, a rocker shaft mounted in the carriage, spaced-apart cutter arms mounted on the rocker shaft, a cutter carried by each arm, an operating arm also mounted on the rocker shaft, a shaft journaled in the carriage bearing a cam for engagement with the rocker arm to impart swinging movement thereto, a spring to hold the operating arm in engagement with the cam, manual means for engaging the cam and arm at the completion of the movement of the carriage.

20. A jar ring cutting machine comprising a frame including guide rods, a feed screw, a carriage, means to engage the carriage with the feed screw, automatic means to disengage the carriage, means to return the carriage to normal position, a mandrel for supporting a rubber tube to be cut, a rocker shaft mounted in the carriage, spaced-apart cutter arms mounted on the rocker shaft, a cutter carried by each arm, an operating arm also mounted on the rocker shaft, a cam shaft bearing a cam for engagement with the rocker arm, means connecting the automatic disengaging means for the carriage with the cam to engage and disengage it and the cutter arm.

21. In a jar ring cutting machine, the combination of a drive shaft bearing a chuck, a mandrel rotated thereby, a cam shaft operated from the driving shaft, a feed screw driven by the cam shaft, a carriage operated by the feed screw, lever connections between the cam shaft and driving shaft adapted to move the mandrel forward and backward, and cutters carried by the carriage and adapted to operate on stock mounted on the mandrel.

22. In a jar ring cutting machine, the combination of a driving shaft bearing a chuck, a tailstock including a spring-actuated yieldable center, a mandrel mounted between the chuck and yieldable center, a cam shaft operated from the driving shaft, a feed screw driven by the cam shaft, a carriage operated by the feed screw, cutters carried by the carriage and adapted to be alternately moved into and out of cutting relation with stock mounted on the mandrel, lever connections between the cam shaft and driving shaft adapted to move the mandrel forward against the yieldable center with the movement of the carriage, and to alternately drop it back limited distances between cutting operations.

23. A jar ring cutting machine comprising a frame including guide rods, a mandrel for supporting a rubber tube to be cut, a feed screw, a carriage mounted on the rods, a nut carried by the carriage to engage the feed screw, a rocker shaft mounted in the carriage, arms carried on said shaft to engage and disengage the nut and feed screw, a handle on said shaft for operating the same and nut, a spring for normally holding the nut out of engagement from the feed screw, means for engaging the handle to hold the nut in engagement with the feed screw, means for automatically releasing the pawl and nut at a predetermined time to disengage the carriage, a cutter arm mounted on the carriage, cam means for operating the cutter arm, and means connecting said automatic means for disengaging the cam and arm.

STUART B. ST. JOHN.